United States Patent
Rosenbloom et al.

(10) Patent No.: US 7,673,020 B2
(45) Date of Patent: Mar. 2, 2010

(54) SYSTEM AND METHOD FOR FACILITATING COMMUNICATION BETWEEN A COMPUTING DEVICE AND MULTIPLE CATEGORIES OF MEDIA DEVICES

(75) Inventors: Oren Rosenbloom, Redmond, WA (US); Joseph D. Ternasky, Mountain View, CA (US); Vladimir Sadovsky, Bellevue, WA (US); Blake D. Manders, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1228 days.

(21) Appl. No.: 10/429,116

(22) Filed: May 2, 2003

(65) Prior Publication Data

US 2004/0221044 A1    Nov. 4, 2004

(51) Int. Cl.
*G06F 15/16* (2006.01)
*G06F 15/173* (2006.01)
*G06F 15/177* (2006.01)

(52) U.S. Cl. .............. 709/220; 709/217; 709/223; 709/225; 709/227; 709/228; 709/230

(58) Field of Classification Search ......... 709/223–225, 709/227–230
See application file for complete search history.

(56) References Cited

U.S. PATENT DOCUMENTS

| | | | |
|---|---|---|---|
| 5,748,736 A | 5/1998 | Mittra | |
| 5,887,193 A * | 3/1999 | Takahashi et al. | ............... 710/8 |
| 5,903,845 A | 5/1999 | Buhrmann et al. | |
| 6,133,908 A | 10/2000 | Scibora | |
| 6,181,342 B1 | 1/2001 | Niblack | |
| 6,233,577 B1 | 5/2001 | Ramasubramani et al. | |
| 6,288,716 B1 * | 9/2001 | Humpleman et al. | ........ 715/733 |
| 6,370,543 B2 | 4/2002 | Hoffert et al. | |
| 6,885,362 B2 * | 4/2005 | Suomela | ..................... 345/156 |
| 6,922,813 B1 | 7/2005 | Korenshtein | |

(Continued)

FOREIGN PATENT DOCUMENTS

CN        1288195 A       3/2001

(Continued)

OTHER PUBLICATIONS

Satran K. Meth, "Internet Small Computer Systems Interface", Apr. 2004, p. 183-p. 205, European Patent Office.

(Continued)

*Primary Examiner*—Nathan J Flynn
*Assistant Examiner*—Joshua Joo
(74) *Attorney, Agent, or Firm*—Shook Hardy & Bacon, LLP

(57) ABSTRACT

A method and system are provided for controlling multiple types of media devices. The method and system also facilitate communication between a computing device and one of a plurality of types of media devices. The system includes device retrieval modules controlled by the computing device for retrieving information from a group of device data sets controlled by the media device. The device data sets including a device information data set that includes a set of properties specific the type of media device. The computing device also includes object retrieval tools for retrieving object information from a group of object data sets stored on the media device and control command modules controlling objects on the media device.

42 Claims, 10 Drawing Sheets

U.S. PATENT DOCUMENTS

| | | | |
|---|---|---|---|
| 7,185,199 B2 | 2/2007 | Balfanz et al. | |
| 7,194,701 B2 | 3/2007 | Stavely et al. | |
| 7,206,853 B2 * | 4/2007 | Eytchison et al. | 709/230 |
| 7,231,456 B1 | 6/2007 | Chiba et al. | |
| 7,246,179 B2 | 7/2007 | Camara et al. | |
| 7,310,734 B2 | 12/2007 | Boate et al. | |
| 7,376,333 B2 | 5/2008 | Chung et al. | |
| 7,441,117 B2 | 10/2008 | Matsuzaki, et al. | |
| 7,500,104 B2 | 3/2009 | Goland | |
| 2001/0014891 A1 | 8/2001 | Hoffert et al. | |
| 2001/0042107 A1 | 11/2001 | Palm | |
| 2002/0035621 A1 * | 3/2002 | Zintel et al. | 709/220 |
| 2002/0065944 A1 | 5/2002 | Hickey et al. | |
| 2002/0112226 A1 | 8/2002 | Brodersen et al. | |
| 2003/0014415 A1 | 1/2003 | Weiss et al. | |
| 2003/0046437 A1 | 3/2003 | Eytchison et al. | |
| 2003/0110369 A1 | 6/2003 | Fish et al. | |
| 2003/0110514 A1 | 6/2003 | West et al. | |
| 2003/0135661 A1 | 7/2003 | Barker et al. | |
| 2003/0200340 A1 * | 10/2003 | Hutter | 709/250 |
| 2004/0076120 A1 | 4/2004 | Ishidoshiro | |
| 2004/0093526 A1 | 5/2004 | Hirsch | |
| 2004/0125756 A1 * | 7/2004 | Lepore et al. | 370/261 |
| 2004/0205286 A1 * | 10/2004 | Bryant et al. | 711/1 |
| 2004/0254014 A1 | 12/2004 | Quraishi et al. | |
| 2005/0232242 A1 | 10/2005 | Karaoguz et al. | |
| 2005/0258806 A1 | 11/2005 | Janik et al. | |
| 2005/0278442 A1 * | 12/2005 | Motoyama et al. | 709/224 |
| 2006/0005259 A1 | 1/2006 | Isozaki et al. | |
| 2006/0015937 A1 | 1/2006 | Illowsky et al. | |
| 2006/0026167 A1 | 2/2006 | Pasumansky et al. | |
| 2006/0036750 A1 | 2/2006 | Ladd et al. | |
| 2006/0129938 A1 * | 6/2006 | Humpleman et al. | 715/734 |
| 2006/0179149 A1 * | 8/2006 | Janning et al. | 709/227 |
| 2006/0179303 A1 | 8/2006 | Gurleyen et al. | |
| 2008/0059622 A1 * | 3/2008 | Hite et al. | 709/223 |

FOREIGN PATENT DOCUMENTS

| | | |
|---|---|---|
| EP | 0 637 157 A2 | 2/1995 |
| EP | 1 081 897 B1 | 3/2001 |
| EP | 1085433 A2 | 3/2001 |
| EP | 1199874 | 4/2002 |
| EP | 1429532 | 6/2004 |
| WO | WO 98/59282 | 12/1998 |
| WO | WO 99/07111 | 2/1999 |
| WO | WO05111869 A3 | 11/2005 |

OTHER PUBLICATIONS

Erik Guttman, "Vendor Extensions ofr Service Location Protocol, Version 2", Oct. 6, 2001, p. 1-p. 7, European Patent Office.

Simpson, "PPP Vendor Extensions", May 1997, pp. 1-p. 5, European Patent Office.

Scott O. Bradner, "Considerations on the Extensibility of IETF Protocols" Jun. 4, 2004, p. 1-p. 10, European Patent Office .

Microsoft Corporation, Apr. 24, 2002, Paragraph 0025-Paragraph 0065, European Patent Office.

Blacke Manders; Oren Rosebloom, "Media Transfer Protocol" May 17, 2004, pp. 1-36, URL:http://www.microsoft.com.

Peter M. Corcoran, "Mapping Home-Network Appliances to TCP/IP Sockets Using a Three-Tiered Home Gateway Architecture," Dept. of Electronic Engineering, University College, Galway, IEEE Transactions on Consumer Electronics, vol. 44, No. 3, Aug. 1998, pp. 729-736.

EPC Search Report, EPO 04010221, Jul. 15, 2005 Microsoft Corporation.

EPC Search Report, EPO 0 5014693, Nov. 24, 2005, Microsoft Corporation.

Final Office Action, Mailed Jul. 23, 2008, in U.S. Appl. No. 10/836,260, filed May 3, 2004.

First Office Action, Mailed Jan. 11, 2008, in U.S. Appl. No. 10/836,260, filed May 3, 2004.

Hullender, Gregory N., "An Efficient Method for Tuning Handwriting Parameters", Microsoft Corporation.

Notice of Allowance and Fee(s) Due, Mailed Apr. 7, 2009, in U.S. Appl. No. 10/912,096, filed Aug. 6, 2004.

Notice of Allowance and Fee(s) Due, Mailed Apr. 21, 2009, in U.S. Appl. No. 10/912,096, filed Aug. 6, 2004.

Notice of Allowance and Fee(s) Due, Mailed Oct. 20, 2008, in U.S. Appl. No. 10/836,260, filed May 3, 2004.

Second Notice of Allowance and Fee(s) Due, Mailed Dec. 16, 2008, in U.S. Appl. No. 10/836,260, filed May 3, 2004.

Office Action mailed Mar. 23, 2007 in Chinese Pat Appl No. 200410043437.X, now Chinese Pat No. CN100472483C.

Office Action mailed Jan. 12, 2009 in U.S. Appl No. 11/166,739.

Office Action mailed Sep. 14, 2009 in U.S. Appl. 11/166,739.

Official Communication mailed Feb. 27, 2007 in EPC Pat Appl 04010221.2.

Second Office Action mailed Sep. 14, 2007 in Chinese Pat Appl. 200410043437.X, now Chinese Pat No. CN100472483C.

* cited by examiner

FIG. 5

INITIATOR MEMORY 210

| SESSION CONTROL TOOLS 212 | DEVICE INFORMATION RETRIEVAL MODULE 214 | DEVICE PROPERTY RETRIEVAL MODULE 216 | DEVICE PROPERTY REVISION MODULE 218 |
| --- | --- | --- | --- |
| OBJECT INFORMATION RETRIEVAL MODULE 219 | OBJECT HANDLE RETRIEVAL MODULE 220 | OBJECT CAPTURE MODULE 222 | OBJECT PROPERTY RETRIEVAL MODULE 224 |
| OBJECT PROPERTY VALUE RETRIEVAL MODULE 225 | OBJECT REVISION MODULE 226 | ASSOCIATION MECHANISM 228 | OPERATION REQUEST DATASET 230 |
| STORAGE LOCATION MODULE 232 | STORAGE PROPERTY RETRIEVAL MODULE 234 | STORAGE REVISION MODULE 236 | |

SYSTEM AND METHOD FOR FACILITATING COMMUNICATION BETWEEN A COMPUTING DEVICE AND MULTIPLE CATEGORIES OF MEDIA DEVICES

CROSS-REFERENCE TO RELATED APPLICATION

Not applicable.

STATEMENT REGARDING FEDERALLY SPONSORED RESEARCH OR DEVELOPMENT

Not applicable.

FIELD OF THE INVENTION

The present invention relates to the field of communications between a computing device and other devices and more particularly to communications between computing devices and multiple types of media devices.

BACKGROUND OF THE INVENTION

Recently, communication protocols have developed for allowing a computing device to control and communicate with media devices such as digital cameras. Existing communication protocols allow for communication between a computing device and a digital still camera. One existing protocol, ISO157540 Picture Transfer Protocol (PTP), incorporated into products of the Microsoft Corporation of Redmond, Wash., can be used in connection with transferring images from imaging devices, such as cameras, to personal computing devices. This protocol defines how the digital still camera can communicate with a personal computing device operating with Microsoft Windows® and a Microsoft® class driver, both products of the Microsoft Corporation of Redmond, Wash.

An extension is needed for existing protocols in order to enable them to function with media devices other than digital still cameras. Such an extension would enable existing operating systems to provide a robust and stable hub for digital media devices. Furthermore, such an extension would enable hardware manufacturers to focus on innovating their hardware and value-add software since basic protocol communication with a personal computing device would no longer be a concern. An analogous example applies to DVD players. DVD manufacturers have been able to focus their efforts in the capabilities of the DVD player, partially due to reliance on the standard connection mechanisms to the television (S-video, composite, etc) for communicating with the television and to reliance on the standard layout of information on the storage media.

Thus, a need exists to facilitate communication between computing devices and other types of media devices. Such devices may include cell phones with or without integrated cameras, digital audio players, digital video players, digital video cameras with still imaging capability, personal digital assistants (PDAs), digital voice recorders, and other types of media devices, or any combinations of the preceding devices. Ideally, a protocol would define mechanisms for describing, configuring and controlling the media device, as PTP does for digital still cameras. A protocol is needed for defining how various media, such as photos, audio/music, and video and other media having associated rich metadata can be transferred to and from a device.

SUMMARY OF THE INVENTION

In one aspect, the invention is directed to a method for facilitating communication between an initiator and responder, wherein the responder is one of a plurality of types of media devices. The method includes providing the responder with a plurality of data sets, the data sets including a set of properties supported by the responder, wherein the properties are specific to the type of media device and providing the initiator with a plurality of control modules for seeking information from the plurality of data sets and for controlling objects of the responder. In embodiments, a computer-readable medium having computer-executable instructions may be used for performing a method for facilitating communication between an initiator and responder.

In an additional aspect, the present invention is directed to a method for controlling a media device. The method includes obtaining a device information data set that specifies a set of supported device and object properties and supported operations specific to the media device and performing operations to obtain a device property description or an object property description associated with the property codes. The method further includes performing desired control operations on a selected object based on knowledge of the device properties and object properties.

In yet an additional aspect, the invention is directed to a system for facilitating control of multiple types of media devices. The system includes device retrieval modules for retrieving information from a group of device data sets, the device data sets including a device information data set that includes a set of properties specific to a type of media device. The system additionally includes object retrieval tools for retrieving object information from a group of object data sets and control command modules for controlling objects on the media device.

In a further aspect, the invention is directed to a system for facilitating communication between an initiator and a responder. The system includes device data sets stored with the responder, the device data sets including at least one device category and a set of properties specific to the category. The system further includes object data sets stored with the responder, the object data sets including information specific to each object and retrieval modules accessible to the initiator for gathering information from the device data sets and the object data sets.

BRIEF DESCRIPTION OF THE DRAWINGS

The present invention is described in detail below with reference to the attached drawing figures, wherein:

FIG. 5 is a block diagram illustrating a memory for an initiator in accordance with an embodiment of the invention;

DETAILED DESCRIPTION OF THE INVENTION

Figure 1:
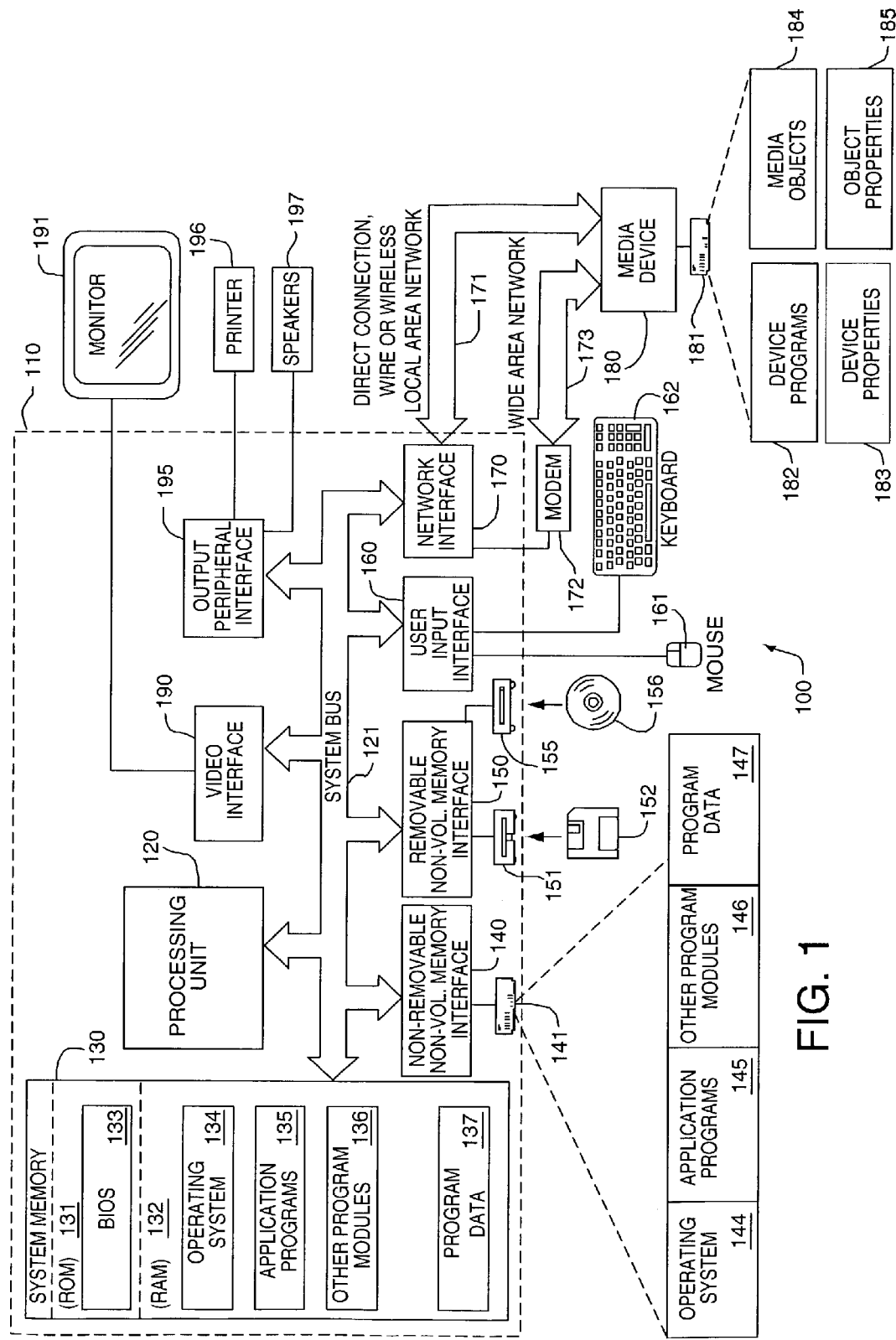
FIG. 1 is a block diagram of a suitable computing system environment for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. As used herein, computer readable media may comprise computer storage media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 182, 183, 184 and 185 as residing on memory device 181. In the displayed embodiment, device programs 182, device properties 183, media objects 184, and object properties 185 are included. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
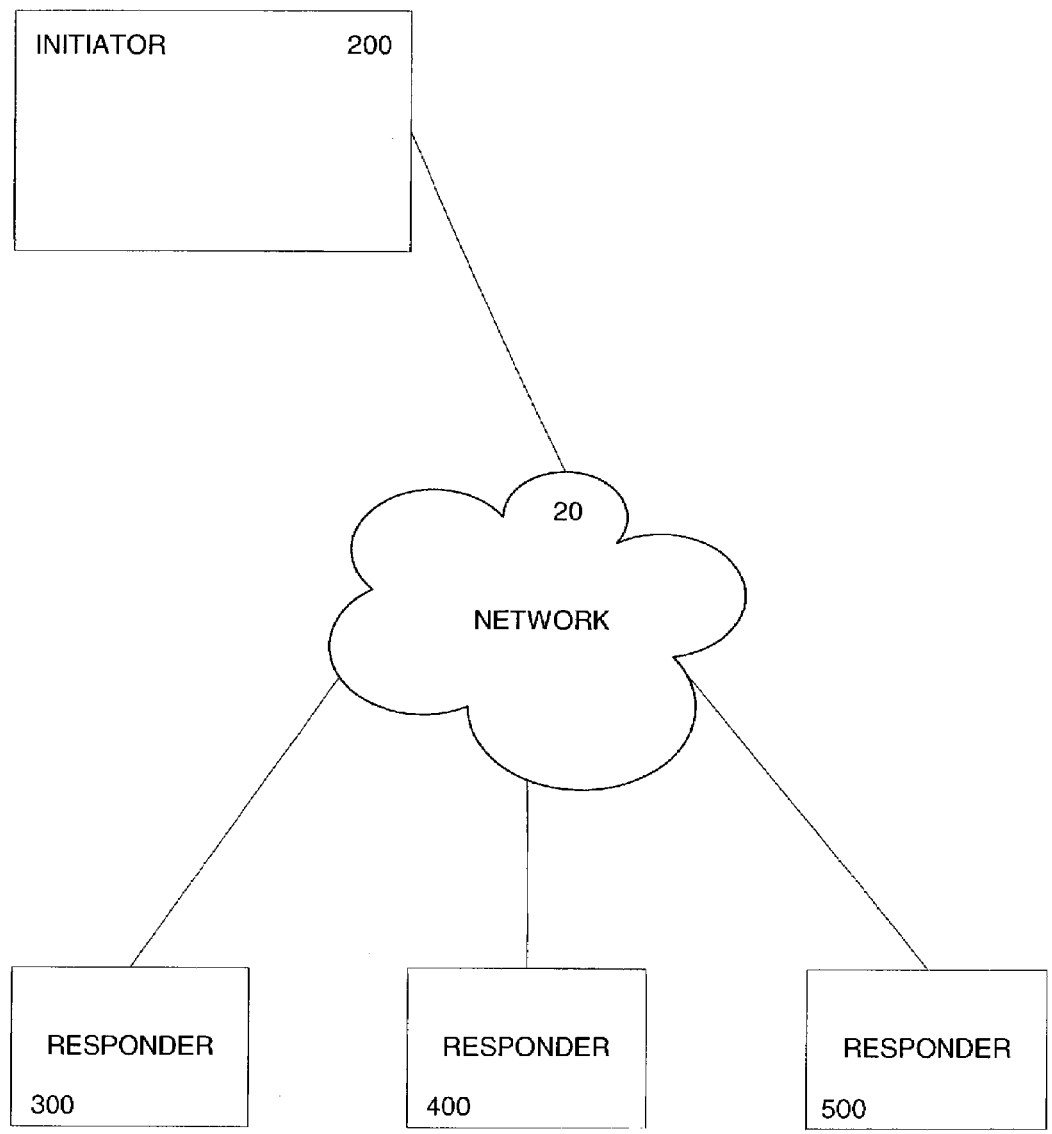
FIG. 2 is a block diagram showing a system of the invention.

FIG. 2 is a block diagram showing an embodiment of a system of the invention. The system includes an initiator 200 capable of communicating over a network 20 with a plurality of responders 300, 400, and 500. The initiator 200 will typically be similar to the computing devices 110 described above in reference to FIG. 1. The responders 300, 400, and 500 represent a plurality of media devices belonging to different categories. These media devices include digital still camera devices, digital video cameras (with or without still image capture functionality), portable media players such as personal music players and personal video players, cell phones (with or without media capturing/playback capabilities), and other media devices. The responders 300, 400, and 500 will typically be divided into categories, each category having a distinct set of properties. The network 20 may be any type of network such as those described above with reference to FIG. 1.

In a typical scenario, the initiator 200 opens a communication session with the responders 300, 400, and 500. The responders 300, 400, and 500 respond with information allowing the communication session to continue. As set forth herein, the personal computing device 110 typically functions as the initiator 200 and the media devices typically function as responders 300, 400, and 500. However, it is possible that a role reversal may occur if a media device opens a communication session with the personal computing device 110. In such an instance, the media devices may be enhanced to include appropriate tools for opening and closing a session, as will further be described below.

Figure 3:
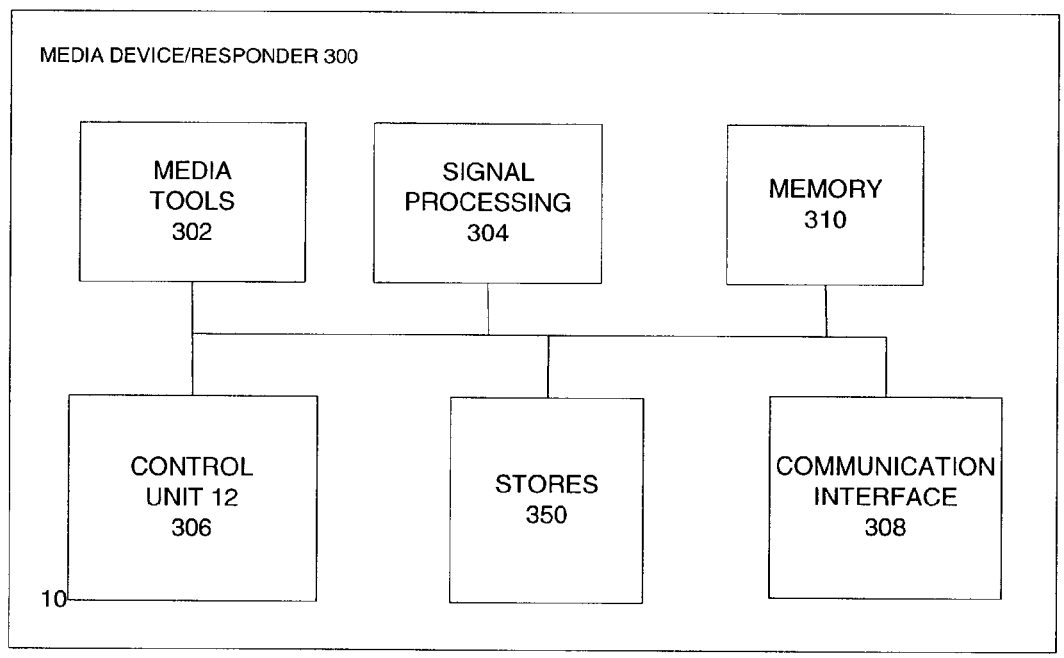
FIG. 3 is a block diagram showing a media device in accordance with an embodiment of the invention.

FIG. 3 is a block diagram illustrating a media device/responder 300 in accordance with an embodiment of the invention. The media device 300 may fit into one of a plurality of categories and the particular features of the media device 300 depend upon whether the media device 300 is a digital still camera device, a digital video camera (with or without still image capture functionality), a portable media player such as a personal music player or personal video player, a cell phone (with or without media capturing/playback capabilities), and other media device. The media device includes media tools 302, a signal processing device 304, a control unit 306, a communication interface 308, a memory 310, and stores 350. The communication interface 308 enables the media device or responder 300 to interact with the computing system or initiator 200. The media tools 302 are specific to the selected media device 300. If the media device 300 is a video or digital camera, the media tools 302 may include an image capturing unit. If the media device 300 is an audio device, the media tools 302 may be audio recording and playing tools. The stores 350 are also specific to the type of media device 300 implemented. The communication interface 308 may be an interface that requires the camera to be directly plugged into the computer system 200 or allows it to be connected to the computer system 200 over the Internet. In one embodiment, the media device 300 is connected with the computer system 200 via a wireless interface.

Figure 4:
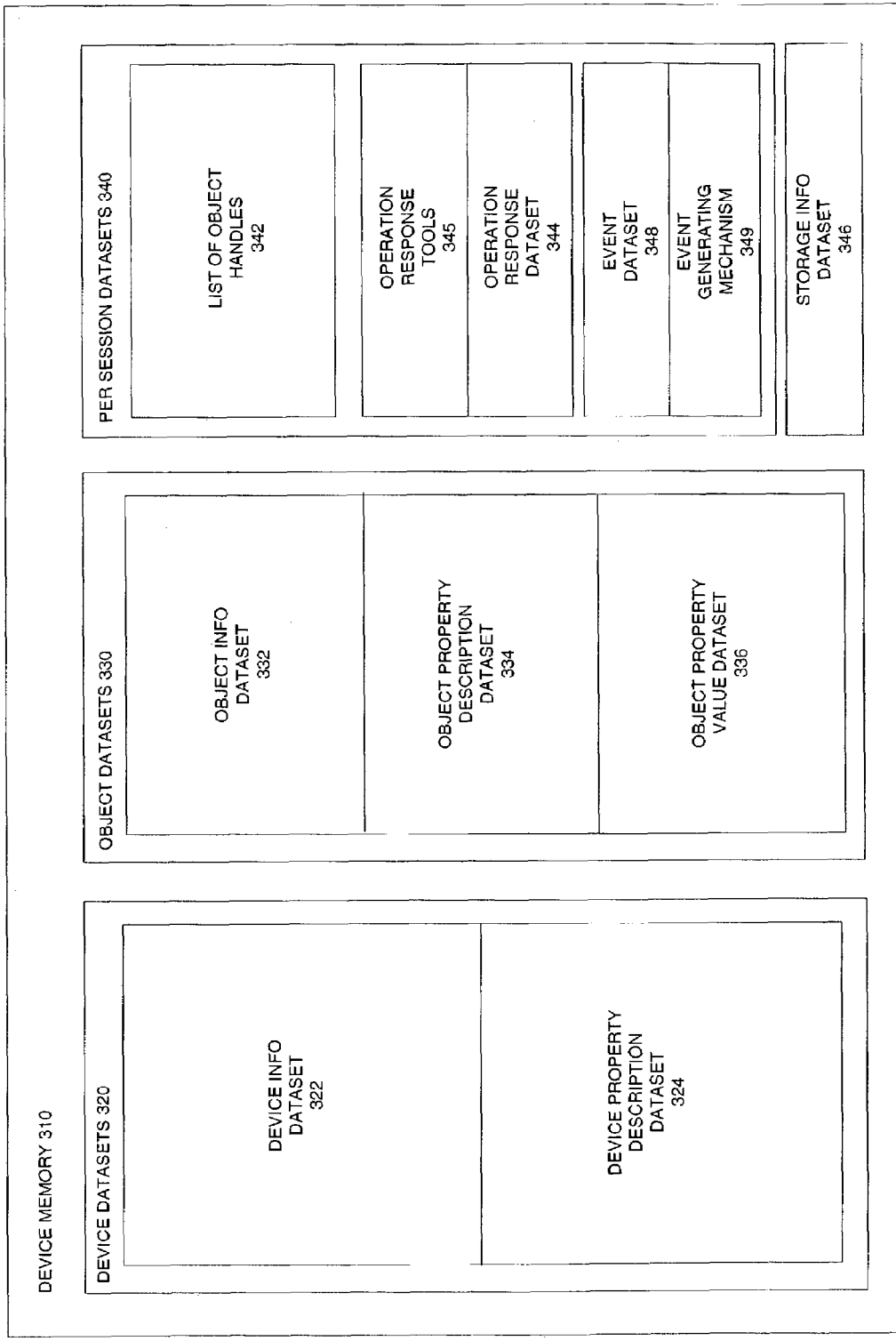
FIG. 4 is a block diagram illustrating a memory for a responder in accordance with an embodiment of the invention.

FIG. 4 is a block diagram illustrating a device/responder memory 310 in accordance with an embodiment of the invention. Regardless of the category and features of the media device 300, in its memory 310, the media device 300 stores device data sets 320, object data sets 330 and per session data sets 340 to facilitate communication with the personal computing device or initiator 200.

Data sets 320, 330, and 340 are composed of data types. In an embodiment of the invention, each data type has a unique 16-bit data code that is used to communicate data types between the initiator 200 and responder 300. Data types include various sizes of signed and unsigned integers, arrays of same, and strings. The summary table below provides an explanation of the data types.

Data Type Summary Table

| TYPE CODE | TYPE NAME | DESCRIPTION |
| --- | --- | --- |
| 0x0000 | UNDEF | Undefined |
| 0x0001 | INT8 | Signed 8 bit integer |
| 0x0002 | UINT8 | Array of unsigned 8 bit integer |
| 0x0003 | INT16 | Signed 16 bit integer |
| 0x0004 | UINT16 | Array of unsigned 16 bit integer |
| 0x0005 | INT32 | Signed 32 bit integer |
| 0x0006 | UINT32 | Array of unsigned 32 bit integer |
| 0x0007 | INT64 | Signed 64 bit integer |
| 0x0008 | UINT64 | Array of unsigned 64 bit integer |
| 0x0009 | INT128 | Signed 128 bit integer |
| 0x000a | UINT128 | Array of unsigned 128 bit integer |
| 0x4001 | AINT8 | Array of signed 8 bit |
| 0x4002 | AUINT8 | Array of unsigned 8 bit |
| 0x4003 | AINT16 | Array of signed 16 bit |
| 0x4004 | AUINT16 | Array of unsigned 16 bit |
| 0x4005 | AINT32 | Array of signed 32 bit |
| 0x4006 | AUINT32 | Array of unsigned 32 bit |
| 0x4007 | AINT64 | Array of signed 64 bit |
| 0x4008 | AUINT64 | Array of unsigned 64 bit |
| 0x4009 | AINT128 | Array of signed 128 bit |
| 0x400a | AUINT128 | Array of unsigned 128 bit |
| 0xffff | STR | Unicode String |

Data sets 320, 330, and 340 are used to describe the higher-level entities used in the protocol, including devices, stores, objects and properties.

Data codes are 16-bit unsigned integers used to identify the different operations, responses, events, properties and formats defined in the protocol. The range of possible 16-bit values is partitioned such that each of these entities is placed in a specific part of the range; this partitioning allows identification of the entity type. Further, each sub-range is split into a set of standard data codes and a set of vendor-defined data codes. The standard data codes are common to all devices using the protocol and the vendor-defined data codes can be used by the vendor to define extensions specific to that vendor's devices. A vendor can share extensions between multiple devices, in which case the devices should express this commonality through the vendor extension fields of the device information data set.

The device data sets 320 include a device information data set 322 and a device property description data set 324. An exemplary device information data set 322 is shown below.

Device Information dataset

| Dataset Field | Field Order | Size (bytes) | Data Type |
| --- | --- | --- | --- |
| Standard Version | 1 | 2 | UINT16 |
| VendorExtensionID | 2 | 4 | UINT32 |
| VendorExtensionVersion | 3 | 2 | UINT16 |
| VendorExtensionDescription | 4 | Variable | String |

-continued

Device Information dataset

| Dataset Field | Field Order | Size (bytes) | Data Type |
|---|---|---|---|
| FunctionalMode | 5 | 2 | UINT16 |
| OperationsSupported | 6 | Variable | AUINT16 |
| EventsSupported | 7 | Variable | AUINT16 |
| PropertiesSupported | 8 | Variable | AUINT16 |
| CaptureFormats | 9 | Variable | AUINT16 |
| ObjectFormats | 10 | Variable | AUINT16 |
| Manufacturer | 11 | Variable | String |
| Model | 12 | Variable | String |
| DeviceVersion | 13 | Variable | String |
| SerialNumber | 14 | Variable | String |

Specifically, the device information data set 322 reports a new version number in field order 1. In fields 2-4, the device data set includes vendor extension information. In field 5, the functional mode field may report a device category. Furthermore, the device properties supported field (field order 8) returned by the device information data set 322 will return a fixed set of property data codes specific to the category or categories supported by the device. The device property codes stored in the properties supported field are capable of describing the attributes of all categories of devices. For example, for video player devices, the device property codes describe the characteristics of the video display on the device. These properties can include, but should not be limited to, screen dimensions, screen brightness, and contrast. This allows a device 300 to support a subset of the full data code set, as well as vendor-extension data codes. The set of vendor-extension data codes implemented by the device are indicated in the vendor extension fields of the device information data set, in field orders 2-4. The specific vendor-extension data codes implemented by the device are indicated in the operations supported, events supported, properties supported, capture formats, and object formats fields of the device information data set, in field orders 6-10. The device information data set 322 is read-only and provides a base level of static device information.

The properties in the properties supported field are defined by a description. The description of standard properties is fixed for all devices while the description of vendor extension properties is common to those devices that implement the same set of vendor extensions. The description fixes a property key, specified as a data code. Properties also have a value, which can be modified per-device (for device properties) or per-object (for object properties).

The device information data set 322 provides additional information on the extensions supported by the device to handle object properties as well as device properties and to handle media formats in addition to image formats. The vendor extension description field, field order 4, describes different extension sets supported by the device. The names of vendor extension sets are specified by a string within the field. The description is preferably readable by both humans and computers. The array returned in the object formats field, field order 10, can include format codes for all types of media formats. The array returned in the capture formats field, field order 9, can include both image formats and other media formats. For example, the format codes are capable of defining image, audio, video, play list, contact and message formats.

The device property description data set 324 further defines the devices properties. A given device will only have one property value for each device property. An exemplary device property description data set 324 is shown below:

Device Property Description dataset

| Field | Field Order | Size (Bytes) | Data Type | Description |
|---|---|---|---|---|
| PropertyCode | 1 | 2 | UINT16 | A specific PropertyCode data code. |
| Datatype | 2 | 2 | UINT16 | The Datatype of the property. |
| GetSet | 3 | 1 | UINT8 | This field indicates whether the property is read-only (Get) or read-write (Get/Set). 0x00 Get 0x01 Get/Set |
| DefaultValue | 4 | DTS | — | Indicates the default setting for the property |
| Current Value | 5 | DTS | — | The current value of the property. |
| FormFlag | 6 | 1 | UINT8 | This field indicates the format of the next fields. 0x00 None. 0x01 Range form. 0x02 Enumeration form. 0x03 DateTime form 0x04 ItemList form 0x05 KeyValue form 0x06 RegularExpression form 0x07 XMLSchema form 0x08 XMLReference form |
| FORM | N/A | — | — | This dataset is determined by the Form Flag. |

The property description data set 324 begins with the property code in field order 1, data type in field order 2, get set in field order 3, and default value in field order 4. The property code field in field order 1 corresponds to the data code for the property. The data type field in field order 2 describes the data type of the property value. The get set field in field order 3 indicates whether the property value may be modified by the initiator 200. The default value field in field order 4 provides a default value for the property. The default value has the data type provided by the data type field in field order 2. The default value may be used to restore a property to its default value, via reset device property value operations described further below. In the device property description data set 324, the current value field in field order 5 provides the current value of the device property.

After the initiator 200 understands the above-described device capabilities as reflected in the device information data set 322 and the device property description data set 324, the initiator 200 can explore the object data sets 330. Objects are the features of interest to most end users. Objects correspond to individual media including pictures, songs or video clips. The bulk of the protocol operations involve characterizing, managing and transferring objects between devices. An object with any format can have object references. If the information in the object data includes static references to other objects on the device, these can be mirrored with object references. For example, an object that has a play list format would store a play list in its object data. This play list is likely a static format that lists several songs in a particular order. The songs themselves are represented on the device 300 as objects with an audio format. The object representing the play list can reference the objects representing songs via object references. This allows any device 300 with access to the objects, including the device on which they are stored, to find the songs in the play list without understanding the particular play list format.

The object data sets include an object information data set 332, an object property description data set 334, and an object property value data set 336. An example of an object information data set 332 is provided below:

Object information dataset

| Dataset Field | Field Order | Size (bytes) | Data Type |
|---|---|---|---|
| StorageID | 1 | 4 | StorageID |
| ObjectFormat | 2 | 2 | ObjectFormatCode |
| ProtectionStatus | 3 | 2 | UINT16 |
| ObjectCompressedSize | 4 | 4 | UINT32 |
| ThumbFormat | 5 | 2 | ObjectFormatCode |
| ThumbCompressedSize | 6 | 4 | UINT32 |
| ThumbPixWidth | 7 | 4 | UINT32 |
| ThumbPixHeight | 8 | 4 | UINT32 |
| ImagePixWidth | 9 | 4 | UINT32 |
| ImagePixHeight | 10 | 4 | UINT32 |
| ImageBitDepth | 11 | 4 | UINT32 |
| ParentObject | 12 | 4 | ObjectHandle |
| AssociationType | 13 | 2 | AssociationCode |
| AssociationDesc | 14 | 4 | AssociationCode |
| SequenceNumber | 15 | 4 | UINT32 |
| Filename | 16 | — | String |
| CaptureDate | 17 | — | DateTimeString |
| ModificationDate | 18 | — | DateTimeString |
| Keywords | 19 | — | String |

The fields of the object information data set 332 describe the characteristics of an object. In the object information data set 332 provided above, the fields are primarily image centric meta-data fields. Objects are characterized by the object information data set 332 and by any number of object properties as set forth in the object property description data set 334 and object references as set forth in the object property value data set 336.

Different devices 300 may offer different levels of support for extended object properties. If the device offers no support, the object information data set 332 can still be used to store information about the corresponding object. The keywords field of field order 19 of the object information data set 332 can be used to store extended object property values. Optimally, the device 300 offers support for a fixed set of object properties and allows the definition of new object properties for the device. In this case, the new properties can be used to store extended property values on the corresponding object.

Each object can have one or more properties from a common set maintained by the device. Object properties share the same range of data codes as device properties and have a parallel set of operations as will further be described below. If a particular property has not been set on a given object, that object will return the default value when queried for that property. When a new object is created on the device it automatically takes on the default value for all outstanding object properties maintained by the device. An exemplary object property description data set 334 is provided below:

Object Property Description dataset

| Field | Field Order | Size (Bytes) | Data Type | Description |
|---|---|---|---|---|
| PropertyCode | 1 | 2 | UINT16 | A specific PropertyCode data code. |
| Datatype | 2 | 2 | UINT16 | The Datatype of the property. |
| GetSet | 3 | 1 | UINT8 | This field indicates whether the property is read-only (Get) or read-write (Get/Set). 0x00 Get 0x01 Get/Set |
| DefaultValue | 4 | DTS | — | Indicates the default setting for the property |
| GroupCode | 5 | 4 | UINT32 | Group to which this property belongs. |
| FormFlag | 6 | 1 | UINT8 | This field indicates the format of the next fields. 0x00 None. 0x01 Range form. 0x02 Enumeration form. 0x03 DateTime form 0x04 ItemList form 0x05 Key Value form 0x06 RegularExpression form 0x07 XMLSchema form 0x08 XMLReference form |
| FORM | N/A | — | — | This dataset is determined by the Form Flag. |

The group code field in field order 5 provides a group code for a specific property group. This field is specific to the object property description data set 334 since device properties are not placed into groups.

Most of the remaining fields in the object property description data set limit the possible values that a property may take. These values are specific to the data type of the property, as provided by the data type field in field order 2, but further restrict the values that the property can take even within that data type. For example, a property that has data type of string (0xFFFF) can be restricted to the string values "red", "green" and "blue".

The form flag field in field order 6 indicates the structure of the remaining fields in the property describing data set. The possible values for this field each have a corresponding list of fields that are appended to the object property description data set 334 after the form flag field itself. For example, a form flag of 0x02 indicates that the property value is restricted to a range of values. The data set will therefore include the minimum value, maximum value and step size fields described by a range form. The first value of the form flag, 0x00, indicates that the property value is not restricted in any way beyond the data type, and therefore, no additional fields appear in the object property description data set 334 after the form flag itself.

On a given device or responder 300, device properties are distinguished from object properties in that each device property will have only one value since there is only one device. However, object properties may take on unique values for each object since there are potentially many objects. This difference is reflected in the differences between the device property description data set, which includes the property value, and the object property description data set, which does not include the property value. The object property description data set 332 describes the object property, but cannot provide all of the values for that property on all of the objects stored on the device. Accordingly, an exemplary object property value data set 336 is provided below:

| Object Property Value dataset | | | | |
|---|---|---|---|---|
| Field name | Field order | Size (bytes) | Datatype | Description |
| NumberofElements | 1 | 4 | UINT32 | Count of elements |
| Element1ObjectHandle | 2 | 4 | ObjectHandle | ObjectHandle of the object this metadata describes. |
| Element1PropertyCode | 3 | 2 | Data code | A description of this metadata element. |
| Element1Value | 4 | DTS | — | Actual value of this metadata. |
| Element2ObjectHandle | 5 | 4 | ObjectHandle | ObjectHandle of the object this metadata describes. |
| Element2PropertyCde | 6 | 2 | Data code | A description of this metadata element. |
| Element2Value | 7 | DTS | — | Actual value of this metadata. |
| ... | | | | |
| ElementNObjectHandle | 5 | 4 | ObjectHandle | ObjectHandle of the object this metadata describes. |
| ElementNPropertyCde | 6 | 2 | Data code | A description of this metadata element. |
| ElementNValue | 7 | DTS | — | Actual value of this metadata. |

Properties that have not been set to a specific value on a given object will return the default value in the object property value data set 336, as defined in the object property description data set 334 for the property in question.

Object handles are 32-bit unsigned integers used to identify objects on the device stores 350. Object handles are transient and can only be used within a single session. The same object will likely be assigned a completely different object handle within a different session, even when the two sessions are concurrent. Object handles can be used to work with individual objects, including reading or writing the object information, properties, or data.

Object property values and device property values have slightly different requirements that are reflected in the description data sets and new operations. First, a given object property has one value for each object on the device as opposed to one value for the entire device. Second, it is convenient to retrieve all or several of the object property values for a large number of objects in one operation, as a block-transfer of data. These operations will be further described below. Third, the value types and restrictions of object properties are more varied than those of device properties. This difference is reflected in the additional variant forms of the object property description data set 334. These forms serve to further restrict the values that on object property can take within its data type.

As set forth above, the responder 300 also includes stores 350, which are physical media that provide persistent storage on the device 300. A storage information data set 346 defines the properties of each store 350 and is provided below:

| Storage Information dataset | | | |
|---|---|---|---|
| Dataset Field | Field Order | Size (bytes) | Data Type |
| StorageType | 1 | 2 | UINT16 |
| FilesystemType | 2 | 2 | UINT16 |
| AccessCapability | 3 | 2 | UINT16 |
| MaxCapacity | 4 | 8 | UINT64 |

-continued

| Storage Information dataset | | | |
|---|---|---|---|
| Dataset Field | Field Order | Size (bytes) | Data Type |
| FreeSpaceInBytes | 5 | 8 | UINT64 |
| FreeSpaceInObjects | 6 | 4 | UINT32 |
| StorageDescription | 7 | Variable | String |
| VolumeLabel | 8 | Variable | String |

Unlike devices and objects, stores 350 do not have individual properties, only the fields collected in the storage information data set 346. The device 300 may have more than one store. The device 300 allocates storage IDs to differentiate the different stores 350 during a session. Stores hold objects and the information associated with the objects.

A store is identified by a Storage ID. Storage IDs are 32 bit unsigned integers that identify a unit of physical storage media, or a drive or connector that could accept such physical media. Each store, or potential store, is allocated to a Storage ID by the device 300 for the duration of a single session.

As shown in FIG. 3, several data sets of the responder 300 are per-session data sets 340 that are unique to each session. These data sets 340 include an operation response data set 344, and event data set 348, and a list of object handles 3422. An event generating mechanism 349 is associated with the event data set 348 and operation response tools 345 are associated with the operation response data set 344. These data sets are further described below in connection with a method of the invention.

FIG. 5 illustrates in an initiator memory 210 in an embodiment of the inventor. The initiator memory 210 may include session control tools 212 for opening, closing and controlling a session between an initiator 200 and a responder 300. A device information retrieval module 214, a device property retrieval module 216, and a device property revision module 218 control interactions with the device information data set 322 and the device property description data set 326. An object information retrieval module 219, object handle retrieval module 220, an object capture module 222, an object property retrieval module 224, an object property value retrieval module 225, and an object revision module 226 control interaction with the object data sets 330 and list of object handles 342. The initiator memory typically also includes an association mechanism 228, an operation request data set 230, a storage location module 232, a storage property retrieval module 234, and a storage revision module 236.

Generally, the session control tools 212 perform an open session operation and cause the device 300 to allocate resources, assign handles to data objects if necessary, and perform any connection-specific initialization. The session control tools 212 assign a session ID. The session ID can be used by all other operations during the session.

If an initiator 200 attempts an open session operation, the attempt may fail if a session is already open and the device 300 does not support multiple sessions. The response session already open should be returned, with the session ID of the already open session as the first response parameter. The response session already open should also be used if the device supports multiple sessions, but a session with the selected session ID is already open. If the device supports multiple sessions, and the maximum number of sessions are open, the device should respond with device busy. Session control tools 212 are also capable of implementing a close session operation in order to close a current session.

The initiator 200 can retrieve the basic characteristics of the device by invoking device information retrieval module 214. The device information retrieval module 214 returns the device information data set 322 for the device 300 by invoking a get device info operation. This operation may be invoked outside of a session but does not initiate a session. In the displayed embodiment, when invoked outside of a session, the session ID and transaction ID of the operation request data set should be set to 0x00000000.

The initiator 200 can use its device information retrieval module 214 to determine the device and object properties supported by a device 300 by examining the property code array returned in the properties supported field of the device information data set 322. The initiator 200 should enumerate the property code array and invoke both the device property retrieval module 216 and the object property retrieval module 224, passing each property code in turn. The array of property codes on the device information data set 322 lists the data codes for both device and object properties. The data codes for both types of properties can be mixed in this array and the initiator 200 is responsible for identifying which property codes define which type of property. The get device property description and get object property description operations implemented by the device property retrieval module 216 and the object property retrieval module 224 determine which type of property a given property code defines.

A given property code can be either a device property or an object property so only one of device property retrieval module 216 and object property retrieval module 224 should be successful. If neither is successful, the property code is invalid for use on the device 300.

If the object property retrieval module 224 operation succeeds for a given property code, the initiator 200 can invoke the object property value retrieval module 225 to retrieve the object property value. Because object property values are specific to individual objects, the initiator 200 will also have to choose an object. If the device property retrieval module 216 is successful, the device property value can generally be determined from the data type in the device property description data set 324.

The device property revision module 218 can modify an existing device property value on the device by invoking a set device property description operation and passing the property code of the property and the new value of the property. The initiator 200 can use the device property description data set 324 to determine the data type of the property and validate the new value for the property. The device property revision module 218 returns a status code to indicate the success of the operation. If the property is not settable, the response access denied is returned. If the value is not allowed by the device, invalid device property value is returned. If the format or size of the property value is incorrect, invalid device property format is returned.

The object handle retrieval module 220 can quickly locate all of the objects on a device. The object handle retrieval module 220 returns an array of object handles present as indicated by the storage ID in the first parameter. If an aggregated list across all stores is desired, this value should be set to 0xFFFFFFFF. The object handle retrieval module 220 returns a list of object handles with one entry for every object stored on the device or on the indicated store. For every object handle in the list, the initiator 200 can invoke object information retrieval module 228 and pass the object handle to retrieve the object information data set 332.

The object information retrieval module 219 returns basic characteristics of an object. By invoking a get object information operation and passing the object handle of a specific object, the object information retrieval module 219 returns the object information data set 332 for the object.

The object property retrieval module 224 can retrieve all of the properties for a given object in bulk by invoking a get object property list operation and passing only the object handle of the object. The object property retrieval module 224 can also obtain only the object properties that are included in one group, indicated by the group value in the object property description data set 334. The object property retrieval module 224 can also retrieve all of the properties for all of the objects on the device in bulk by passing the "all objects" value for the object handle.

The object property value retrieval module 225 can retrieve the property values for a given object. By invoking a get object property value operation and passing both the object handle of the object and the property code of the property, the object property value retrieval module 225 will return only the property value. The initiator 200 can use the information in the corresponding object property description data set 334 to interpret the property value. The object property value retrieval module 225 can also return a list of object property value data sets 336, with each data set including the same object handle, a specific property code, and a specific property value.

The object revision module 226 can modify an existing object property value of an object by invoking a set object property value operation and passing the object handle of the object, the property code of the property, and the new value of the property. The object revision module 226 can use the object property description data set 334 to determine the data type of the property. The object revision module 226 will return a status code to indicate the success of the operation.

The object revision module 226 can also restore an existing object property value on an object by invoking a reset object property value operation and passing the object handle of the object and the property code of the property. The object revision module 226 will apply a default value defined in the object property description data set 334 of the property.

The object revision module 226 can also modify all of the properties for a given object in bulk by invoking a set object property list operation and passing object property value data sets 336 that only refer to the given objects and properties. The total number of object properties set by this operation is determined by the first field of the object property value data set 336. Each entry in the array is sufficient to describe which object is being modified, which object property is being set, and what value is being set on that object property.

The object revision module 226 can define a new object property by invoking a set object property description operation and passing an object property description data set 334 with the fields set to proper values. The object revision module 226 returns a status code that indicates the success or failure of the operation. If the operation succeeds, the new object property has been added to the device and may be applied to existing or new objects. Existing objects for which the object property has not been given a value will report the default value specified in the object property description data set 334. If the operation fails, the new object property remains undefined on the device and may not be applied to any existing or new objects.

The object revision module 226 can also build an arbitrary collection of objects by first creating a new object and then placing references on that object. Every object that the initiator 200 wants to include in the collection should have a corresponding reference.

The initiator 200 can also modify the arbitrary collection by retrieving the object handle of the object that represents the collection using the object handle retrieval module 220. The object handle retrieval module 220 can use the object handle of the collection object to return a list of object handles, with each object handle in the list corresponding to an object that previously belonged to the collection. The object revision module 226 can modify this list, removing object handles that correspond to objects that no longer belong to the collection or adding object handles that correspond to objects that are being added to the collection.

An object capture module 222 can request that the device 300 capture a new media object through an asynchronous process. The object capture module 222 can begin with an initiate capture operation and the device 300 will signal the end of the process with a capture complete or storage full event. The device 300 will also use object added events, further described below, to signal the creation of new media objects on the device 300. While the capture is ongoing, the device may generate object added events to signal that new media objects were generated by the capture process. One object added event will be generated for each new media object created on the device. If a capture generates new objects but the store 350 does not have enough free space to accommodate the objects, the device 300 may generate a storage full event. When the capture is complete and successful, the device may generate a capture complete event. Event generation is further described below in relation to the even generating mechanism 349.

To use the created arbitrary collection, the initiator 200 starts with the object handle of the object that represents the collection. The initiator then requests the references from the collection object by invoking the get object references list operation. The references are returned as a list of object handles, with one object handle per reference. The object handle retrieval module 220 can further obtain a list of object handles and use the list to retrieve the object information data set 332, and thus, the properties, the references, or the data of those objects.

The storage property retrieval module 234 can retrieve the basic characteristics of the store 350 by invoking a get store information operation using the storage ID of a specific store. The storage property retrieval module 234 will return the storage information data set 346.

The storage revision module 236 can track changes in the storage information data set 346 by receiving and handling a storage information changed event. For additional information about changes in the storage information data set 346, the storage property retrieval module 234 retrieves the storage information data set 346 and the initiator 200 can inspect the storage information data set 346 for changes.

A storage location module 232 can help the initiator 200 to find all of the stores on the device 300. The storage location module 232 will invoke a get store IDs operation to return a list of storage IDs. The list may contain storage IDs for valid logical stores. Storage IDs for valid logical stores will have a non-zero physical storage ID part and a non-zero logical storage ID part. The array may also contain storage IDs for removable media drives that do not currently have media inserted into the drive. Storage IDs for drives that do not have media inserted will have a non-zero physical storage ID part but a zero logical storage ID part. The storage property retrieval module 234 can use the storage ID retrieved by the storage location module 232 to retrieve the corresponding storage information data set 346.

The association mechanism 228 of the initiator memory 210 handles a tree-structured organization of objects on a store. Associations are sets of objects, themselves represented as objects. Membership in an association is exclusive such that no object can belong to more than one association. Furthermore, the associations are organized into a hierarchy that usually parallels the underlying file system used to represent the objects on a store 350. Associations are similar to directories in a computer file system or folders in the desktop user interface metaphor.

The arrangement of associations organizes all of the objects on a store 350 into a parent/child hierarchy. This organization is communicated to the initiator via a parent object field of the object information data set 332. Each object is a child of some parent, and the parent is specified by the object handle returned in the parent object field. The object handle in the parent object field always points to an association. Each association will have a parent object that is also an association, except the top-most parent, or root of the hierarchy on each store.

References are object handles stored with each object. An object can have any number of references. Each reference is a type-less directed pointer to another object on the same device and store. For example, a reference from Object A to Object B is placed on Object A and points to Object B. Because references are represented as object handles, they are only valid during one session. Both the initiator 200 and the responder 300 are responsible for converting references into another, static form if their meaning is to be preserved between sessions.

References can be used to build arbitrary, possibly overlapping collections of objects. For example, suppose a device 300 stores songs as objects, with the sampled music represented in the data of those objects. The same device could store play lists as objects with references from a play list object to all of the music objects or songs included in that play list. Each music object could belong to one or more play lists. Since the play list uses object handles to specify the included music objects, changes to the location or name of the music object will not affect the composition of the play list.

As another example, music objects could use references to specify licenses that should be checked by a digital rights management (DRM) system to allow access to the sampled music content. The licenses themselves would also be represented as objects, and those license objects could use references to indicate the music objects to which they apply. The music objects could use references to indicate which licenses control access to their content. References in both directions would allow the association mechanism 228 to quickly find all of the license objects that apply to a single music object or find all of the music objects covered by one license object.

Each object has an array of object handles that reference other objects on the same device and ideally the same store. Object references are directed pointers that lead from a source object to a target object. The object references are maintained by the device in a static format that allows fast access to the target object from the source object, but the protocol works only with the object handles. The object references from a source object can be retrieved with the object handle retrieval module 220, which returns an array of object handles. Likewise, the object references from a source object can be modified with the object revision module 226. Object references in both directions are used to implement pointers in both directions.

Communications between the initiator 200 and responder 300 take place in discrete steps called transactions. Transactions can take the form of operations, which are requested by the initiator 200 as described above and also may take the form of events. Events are sent by the responder 300 and received by the initiator 200.

With all of the aforementioned operations, the initiator 200 takes action by requesting operations, which includes building the operation request data set 230, and sending the operation request data set 230 to the responder 300. The responder 300 then builds the operation response data set 344. A single interaction between the initiator and the responder is one transaction and a sequence of transactions occurs within one session. Typically, communications between the initiator 200 and the responder 300 form a communication session. An exemplary operation request data set 230 is shown below:

| Operation Request Dataset | | | |
|---|---|---|---|
| Dataset Field | Field Order | Size (bytes) | Data Type |
| Operation Code | 1 | 2 | UINT16 |
| Session ID | 2 | 4 | UINT32 |
| Transaction ID | 3 | 4 | UINT32 |
| Parameter 1 | 4 | 4 | Any |
| Parameter 2 | 5 | 4 | Any |
| Parameter 3 | 6 | 4 | Any |
| Parameter 4 | 7 | 4 | Any |
| Parameter 5 | 8 | 4 | Any |

An operation code in field order 1 specifies the operation requested. The operation code is preferably a 16 bit unsigned integer limited to specific ranges for standard and extended operations. In this example, standard operation codes common to all implementations are limited to the range 0x1000 to 0x1fff. Extended operation codes, proprietary to a specific implementation, may occupy the range 0x9000 to 0x9fff.

The session ID field specifies the session in which this operation is being initiated. For operations that are initiated outside of any session, or for operations that initiate a new session, the session ID field is set to 0x00000000. The session ID field of the operation response data set 344 must be the same as the session ID field of the corresponding operation request data set 230. The session ID is an unsigned, 32-bit integer chosen by the initiator 200 with the session control tools 212 when a session is opened. The session ID is preferably unique to both the initiator 200 and the responder 300.

The session ID is included in all operation request data sets 230 and operation response data sets 344 to associate an operation or event with the session in which it takes place.

The session and the session ID allow a device to maintain multiple, concurrent sessions with the same device or with different devices. For example, two different applications running on the same host initiator 200 could open separate sessions with one target device 300. The first application might use the session to retrieve and modify the device properties while the second application uses a different session to download new media objects into the device 300.

The transaction ID specifies the transaction that the operation is initiating. The transaction ID must start at zero in the operation that initiates a new session and should increment by one with each additional transaction. The transaction ID field of the operation response data set 344 must be the same as the transaction ID field of the corresponding operation request data set 230. The transaction ID is an unsigned 32-bit integer that is unique within a session. The transaction ID is sent in the operation request data set 230 by the initiator 200 and returned in the corresponding operation response data set 344 by the responder 300.

The initiator 200 is responsible for generating the sequence of transaction IDs and the responder 300 is responsible for checking that the incoming transaction IDs have not already been used in a previous transaction. Thus, the initiator 200 keeps track of the last transaction ID used in an operation request data set 230 or event data set, incrementing it by one, using the value in an operation request data set or event data set 348, and saving the last value as the last transaction ID. The responder 300 may check that the new transaction ID is greater than any previously received transaction ID and store the incoming transaction ID as the highest, previously received transaction ID.

The transaction ID allows both parties to the session to correlate the different data sets involved in a transaction, including the operation request data set 230, the operation response data set 344 and the event data set 348. This capability is especially important when an asynchronous event, such as a transaction cancellation, signals a change in status for an outstanding transaction.

The parameter fields, 1-5, are interpreted differently by each operation. Any parameter fields that are not used by a given operation should set to 0x0000000. The responder 300 responds to operations after receiving the operation request data set 230, potentially receiving data from the initiator, or potentially sending data to the initiator. A given transaction may either transfer data from the initiator to the receiver in the request, or from the receiver to the initiator in the response, but not both. The responder 300 may build the operation response data set 344 and send it to the initiator. An exemplary operation response data set 344 is shown below:

| Operation Response Dataset | | | |
|---|---|---|---|
| Dataset Field | Field Order | Size (bytes) | Datatype |
| Response Code | 1 | 2 | UINT16 |
| Session ID | 2 | 4 | UINT32 |
| Transaction ID | 3 | 4 | UINT32 |
| Parameter 1 | 4 | 4 | Any |
| Parameter 2 | 5 | 4 | Any |
| Parameter 3 | 6 | 4 | Any |
| Parameter 4 | 7 | 4 | Any |
| Parameter 5 | 8 | 4 | Any |

The response code field of the operation response data set 344 contains a data code that specifies the response given. The response code is a 16-bit unsigned integer limited to specific ranges for standard and extended responses. Standard response codes, generally common to all implementations, are limited to the range 0x2000 to 0x2fff. Extended response codes, proprietary to a specific implementation, are limited to the range 0xa000 to 0xafff. The additional parameters are substantially as described above with respect to the operation request data set 230.

During a transaction, data flows in one direction or the other. The initiator 200 can send data to the responder 300 or the responder 300 can send data to the initiator 200. The initiator 200 can also send information to the responder 300 in the operation request data set 230 and the responder 300 can send information to the initiator 200 in the operation response data set 344, but this information is limited by the size and number of parameter fields in the respective data sets.

When objects change on a device 300, or when operations are performed, the device 300 may generate an event data set 348 using the event generating mechanism 349. An exemplary event data set 348 is shown below:

| Event Dataset | | | |
| --- | --- | --- | --- |
| Dataset Field | Field Order | Size(bytes) | Data Type |
| Event Code | 1 | 2 | UINT16 |
| Session ID | 2 | 4 | UINT32 |
| Transaction ID | 3 | 4 | UINT32 |
| Parameter 1 | 4 | 4 | Any |
| Parameter 2 | 5 | 4 | Any |
| Parameter 3 | 6 | 4 | Any |

Events can be sent by the initiator 200 but are typically sent by the responder 300. The event code field specifies the event generated. The event code in field order 1 is a 16-bit unsigned integer limited to specific ranges for standard and extended events. Standard event codes are limited to the range 0X4000 to 0x4fff. Extended event codes, proprietary to a specific implementation, are limited to the range 0xc000 to 0xcfff.

The session ID field in field order 2 specifies the session to which this event applies. If the event applies to a specific operation, the session ID field of the event data set is the same as the session ID of the corresponding operation request data set 230. If the event applies to a specific session, the session ID field of the event data set 348 must be set to the session ID of that session. Finally, if the event applies to all outstanding sessions, the session ID should be set to 0xffffffff.

The transaction ID field in field order 3 specifies the transaction to which this event applies. If the event applies to a specific operation, the transaction ID field of the event data set must be the same as the transaction ID of the corresponding operation request data set 230. If the event does not apply to a specific transaction, the transaction ID field should be set to 0xffffffff. The parameter fields, 1 through 3, are interpreted differently for each event. Any parameter fields that are not used by a given operation should be set to 0x0000000.

Multiple types of events may be generated. When the device information data set 322 changes, the event generating mechanism 349 may generate a device information changed event or a object information changed event. Both events result from changes external to a session or changes that are not caused by the initiator 200. To receive information about the change, the initiator 200 would invoke the device information retrieval module 214 or the object information retrieval module 219 to retrieve the appropriate information set. Similarly, when a device property value or an object property is modified, the event generating mechanism 349 may generate a device property changed event or an object property changed event.

When new objects are created on a store 350, the event generating mechanism 349 may generate an object added event. If more than one object is created at the same time, a separate object added event will be generated for each new object. This event is only generated when objects are explicitly created by the device 300 or by another session. The object added event includes the object handle of the new object as a parameter. To seek information, the initiator 200 should use the object information retrieval module 220 to invoke the get object information operation and obtain the object information data set 332.

When new stores are added to the device 300, the event generating mechanism 349 may generate a storage added event rather than an objected added event. The storage added event includes the storage ID of the added store as a parameter. If more than one logical store is added to the device at the same time by the insertion of one piece of physical storage media, only one storage added event will be generated by the device 300. The storage ID of a new store is valid if a single logical store has been added. If more than one logical store has been added at the same time, possibly by a single physical store, the storage ID will be 0x00000000. If the initiator 200 seeks information about the new store 350, it should use the appropriate operation to retrieve the storage information data set 346.

The event generating mechanism 349 also may generate an object removed event. If more than one object is removed at the same time, a separate object removed event will be generated for each removed object. This event is only generated when objects are explicitly deleted by the device 300 or by another session. The event is not generated when existing stores are removed from the device, even if the removed stores had objects stored on them. Instead, the event generating mechanism 349 may generate a storage removed event when an existing store 350 is removed from the device 300.

The storage removed event includes the storage ID of the removed store as a parameter The initiator 200 should not use this storage ID to characterize the store or to work with objects on the store. Rather, the initiator 200 should use this storage ID to update its own information about the stores 350 and objects available on the device 300.

Figure 6:
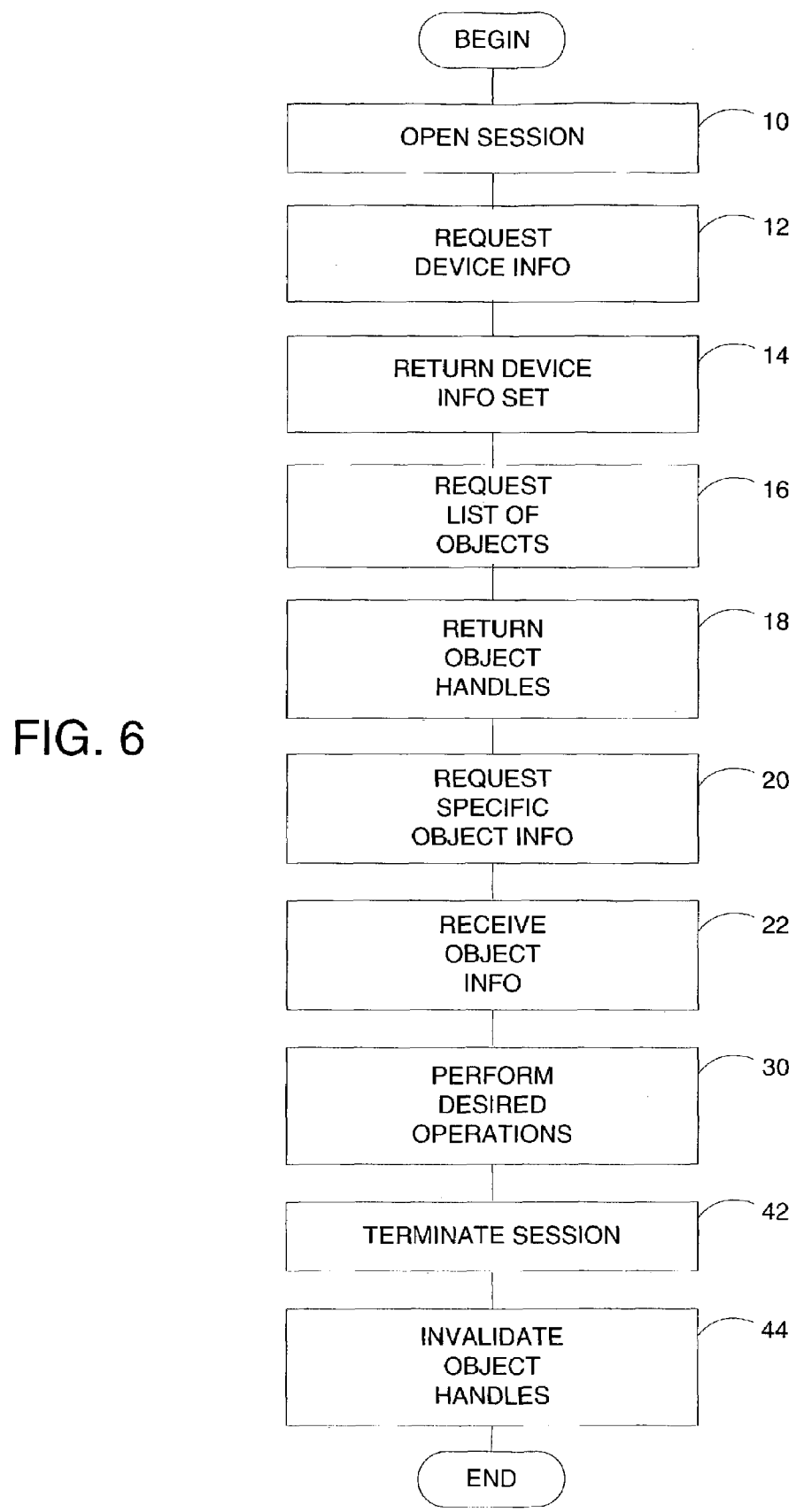
FIG. 6 is a flow chart illustrating steps involved in a session between an initiator and a responder.

FIG. 6 is a flowchart illustrating an exemplary session between an initiator 200 and a responder 300. In step 10, the initiator 200 uses its session control tools 212 to open a session with the responder 300. Although step 10 signifies the beginning of a session, the communications sequence cannot occur if the device 300 does not first identity itself as supporting the protocol. The transport layer upon which the protocol is built determines the manner of identification. The device 300 can be involved in more than one session at the same time, but concurrent sessions are independent of each other. All communication between the parties to a session is qualified by a session ID that is unique to that session. The session ID is chosen by the initiator 200 when the session is started and it must be unique for both the initiator 200 and responder 300.

In step 12, the initiator 200 generally requests information about the device 300 using the device information retrieval module 214. In step 14, the responder 300 will return the device information data set 322. As set forth above, the device information data set 322 contains, among other data, lists of supported data codes. The device information data set 322 is read-only and provides a base level of static device information. For more detailed information, the initiator 200 can use the device property retrieval module 216 to retrieve the device property description data set 324.

When the initiator 200 understands the capabilities of the responder 300, it can then proceed to step 16 to query the device for a list of objects on the device using the object handle retrieval module 220. Object handle values are transient and do not persist after a close session operation or a disconnection event. In step 18, the device 300 returns a list of object handles.

In step 20, the initiator 200 queries the responder 300 for information specific to each object using the object property retrieval module 224. Each object property is uniquely identified by an object property data code in the object property description data set 334. The object property description data set 334 is returned in step 22. The object property description data set 334 describes the size (in bytes) and the data type of the object property value.

After the device capabilities are understood and the objects on the device have been characterized, the initiator 200 may proceed to upload or retrieve objects; add, alter or remove object metadata; or perform any other operations supported by the device in procedure 30.

The operations performed may include any of those operations described above with respect to FIG. 5. These commands enable control of the media device 300. Manipulation of objects from media devices in different categories will result in different operations. For example, media playback devices require control commands that differ from digital still cameras. To control playback from the initiator 200, manipulation of objects on the media playback device 300 may result in commands as play, pause, next track, fast-forward, etc.

When the initiator 200 has completed desired operations the session control tools 212 can terminate the session in step 42. The session control tools 212 invalidate existing object handles in step 44.

The above-described protocol is transport layer agnostic and can be implemented over USB, USB 2.0, IEEE 1394, Bluetooth, UPnP, TCP/IP, or any transport layer that satisfies the transport requirements. Additionally, this protocol provides broad media type support, extensibility, and metadata support.

Figure 7:
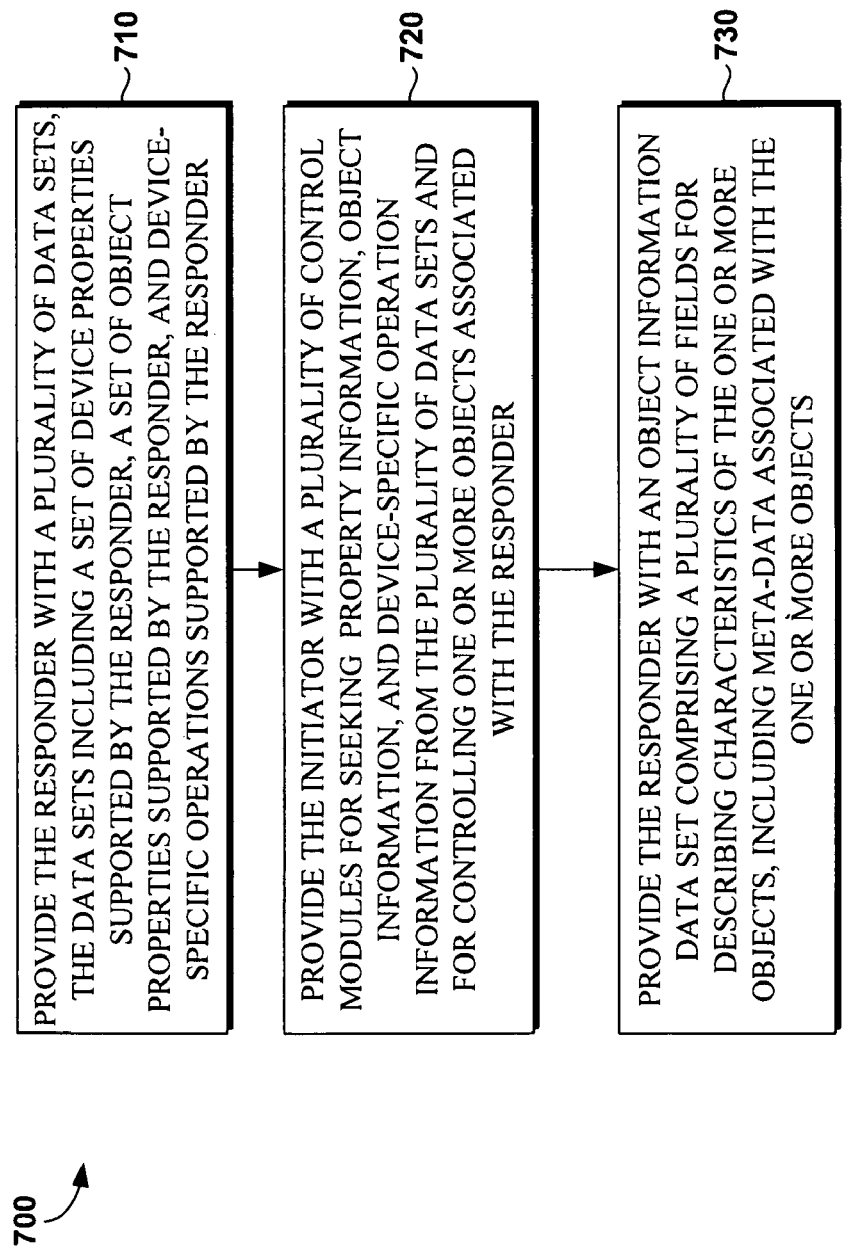
FIG. 7 illustrates a flow diagram of a method for facilitating communication between an initiator and a responder utilizing an extensible protocol in accordance with an embodiment of the present invention.

FIG. 7 illustrates a flow diagram 700 of a method for facilitating communication between an initiator and a responder utilizing an extensible protocol in accordance with an embodiment of the present invention. Initially, as indicated at block 710, a responder is provided with a plurality of data sets. The data sets include a set of device properties supported by the responder, a set of object properties supported by the responder, and device-specific operations supported by the responder. Thereafter, at block 720, an initiator is provided with a plurality of control modules for seeking property information, object information, and device-specific information from the plurality of data sets and for controlling one or more objects associated with the responder. At block 730, responder is provided with an object information data set comprising a plurality of fields for describing characteristics of the one or more objects. The objects may include meta-data associated with the one or more objects.

Figure 8:
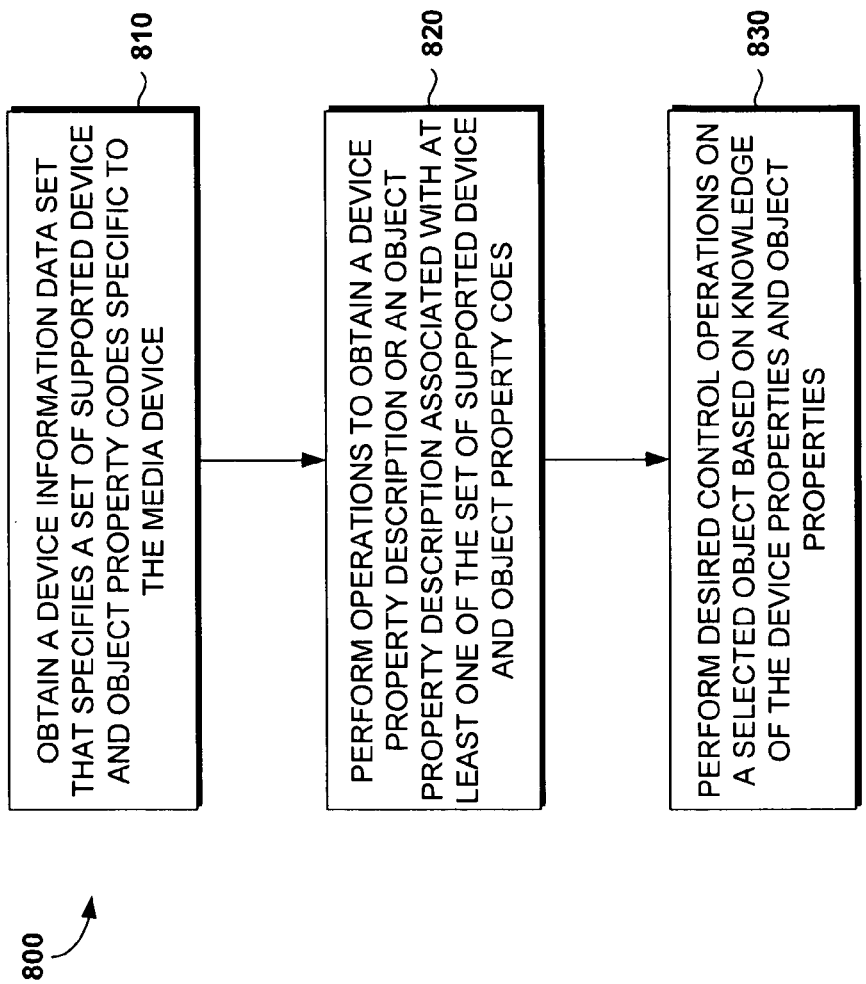
FIG. 8 illustrates a flow diagram of a method for controlling a media device utilizing an extensible protocol in accordance with an embodiment of the present invention.

FIG. 8 illustrates a flow diagram 800 of a method for controlling a media device utilizing an extensible protocol in accordance with an embodiment of the present invention. Initially, as indicated at block 810, device information data set is obtained. The device information data set may specify a set of supported device and object property codes that may be specific to the media device. Thereafter, at block 820, operations are performed to obtain a device property description or an object property description associated with at least one of the set of supported device and object property codes. At block 830, desired control operations are performed on a selected object based on knowledge of the device properties and object properties.

Figure 9:
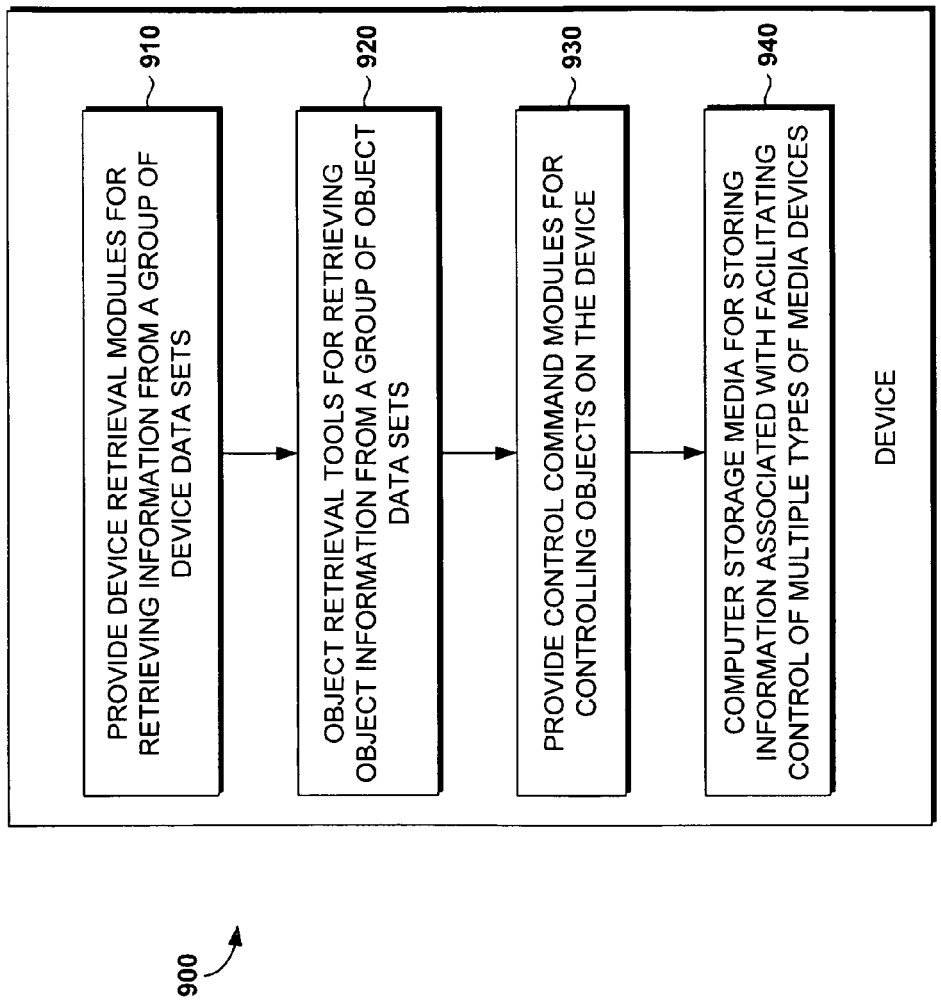
FIG. 9 illustrates a system for facilitating control of multiple types of media devices utilizing an extensible protocol in accordance with an embodiment of the present invention.

FIG. 9 illustrates a system 900 for facilitating control of multiple types of media devices utilizing an extensible protocol in accordance with an embodiment of the present invention. As shown in FIG. 9, a system 900 includes device retrieval modules 910, object retrieval tools 920, control command modules 930 and computer storage media 940. Device retrieval modules 910 may be used for retrieving information from a group of device data sets, wherein at least one of the group of device data sets may include a device information data set that may include a set of properties specific to a type of media device. Object retrieval tools 920 may be used for retrieving object information from a group of object data sets. Control command modules 930 may be used for controlling objects on a device. Computer storage media may be used for storing information associated with facilitating control of multiple types of media devices.

Figure 10:
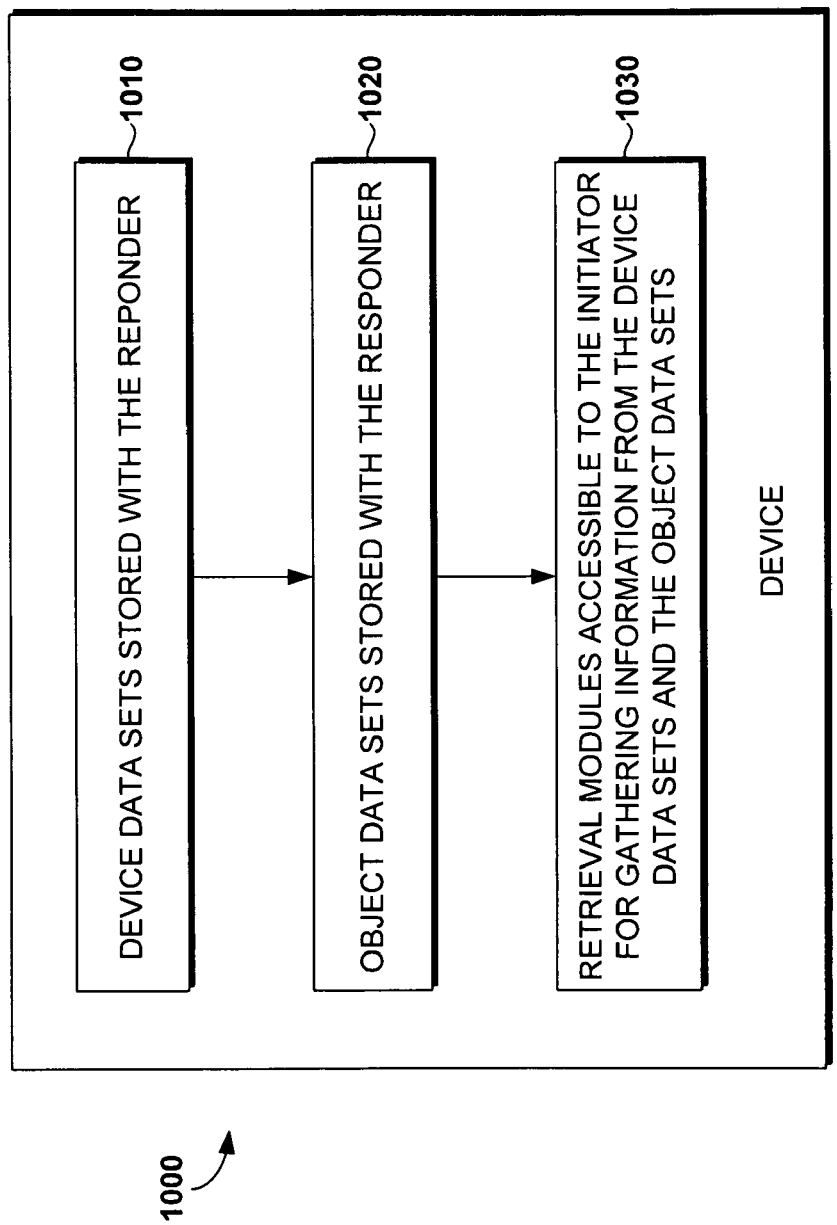
FIG. 10 illustrates a system for facilitating communication between an initiator and a responder utilizing an extensible protocol in accordance with an embodiment of the present invention.

FIG. 10 illustrates a system 1000 for facilitating communication between an initiator and a responder utilizing an extensible protocol in accordance with an embodiment of the present invention. As shown in FIG. 10, a system 1000 includes device data sets 1010, object data sets 1020, and retrieval modules 1030. Device data sets 1010 may be stored with the responder. Device data sets 1010 may include at least one device category and a set of properties specific to the category. Object data sets 1020 may be stored with the responder. Object data sets 1020 may include information specific to each subject. Retrieval modules 1030 may be accessible to the initiator for gathering information from the device data sets and the object data sets.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and with the scope of the claims.

We claim:

1. A method for facilitating communication between an initiator and a responder utilizing an extensible protocol, the method comprising:

providing the responder with one or more objects corresponding to still images, audio, or video, an object information data set specific to one or more objects, and a plurality of data sets, the plurality of data sets including a set of device properties supported by the responder, a set of object properties supported by the responder, and device-specific operations supported by the responder, wherein the set of device properties comprise standard data codes that are common to all of a plurality of types of media devices using the extensible protocol and vendor-specific data codes that are specific to media devices of a vendor; and providing the initiator with a plurality of control modules for obtaining the object information data set, obtaining information on the set of device properties, the set of object properties, and the device-specific operations to determine capabilities of the responder, and for controlling the one or more objects associated with the responder by utilizing the obtained information and the extensible protocol;

wherein the object information data set comprises a plurality of fields for describing characteristics of the one or more objects, including meta-data associated with the one or more objects, wherein the meta-data includes descriptions, modifications, format information, associations, or combinations thereof, wherein the extensible protocol includes a set of extensions to support a plurality of different transport layers, the extensions comprising support for the standard data codes and the vendor-specific data codes, including a set of extensions to Picture Transfer Protocol, wherein the extensions included in the extensible protocol provide support for each of the plurality of types of media devices, the plurality of types of media devices belonging to different categories;

wherein the initiator is a personal computing device, wherein the extensible protocol defines transport layer agnostic transfer of still images, audio, and video, as well as meta-data associated with the still images, audio, and video, between the personal computing device and the plurality of types of media devices, and wherein the responder is one of the plurality of types of media devices.

2. The method of claim 1, further comprising providing the responder with a device information data set, wherein the device information data set comprises property codes for object properties and device properties.

3. The method of claim 2, further comprising providing the initiator with a device information retrieval module and an object information retrieval module in order to identify a type of property identified by the property codes.

4. The method of claim 2, further comprising providing a media device category within a functional mode field of the device information data set.

5. The method of claim 2, further comprising providing the responder with a device property description data set.

6. The method of claim 2, further comprising providing an object property description data set for enumerating properties of a selected object.

7. The method of claim 1, further comprising providing the initiator with session control tools for opening a communication session with the responder.

8. The method of claim 2, further comprising providing the initiator with device information retrieval tools for retrieving information from the device information data set.

9. The method of claim 8, further comprising providing the initiator with an object information retrieval module for retrieving object information.

10. The method of claim 1, further comprising providing the initiator with an object revision module for revising objects on the responder.

11. The method of claim 1, further comprising providing the initiator with an object capture module for instructing the responder to capture and add new objects.

12. The method of claim 1, further comprising providing the initiator with an association mechanism for associating one selected object with at least one other selected object.

13. A computer-readable medium having instructions embodied thereon that, when executed, performs the method recited in claim 1.

14. A method for controlling a media device utilizing an extensible protocol, the method comprising:

obtaining, by an initiator, a device information data set that specifies a set of supported device and object property codes specific to the media device, from the media device, to determine capabilities of the media device, wherein the set of supported device property codes comprise standard data codes that are common to all of a plurality of types of media devices using the extensible protocol and vendor-specific data codes that are specific to media devices of a vendor;

performing, by an initiator, operations to obtain a device property description or an object property description associated with at least one of the set of supported device and object property codes; and performing, by an initiator, desired control operations on a selected object corresponding to a still image, audio, or video stored on the media device by utilizing obtained device information data set and the extensible protocol and based on knowledge of the device properties codes and object properties codes, wherein performing operations to obtain a device property description or an object property description comprises using a device property retrieval module and an object property retrieval module to obtain a device property description data set or an object property description data set, wherein the object property description includes meta-data associated with an object, wherein the meta-data includes descriptions, modifications, format information, associations, or combinations thereof, wherein the extensible protocol includes a set of extensions to support a plurality of different transport layers, the extensions comprising support for the standard data codes and the vendor-specific data codes, including a set of extensions to Picture Transfer Protocol, wherein the extensible protocol provides support for each of the plurality of types of media devices, the plurality of types of media devices belonging to different categories, wherein the extensible protocol defines transport layer agnostic transfer of still images, audio, and video, as well as meta-data associated with the still images, audio, and video, between a personal computing device and the plurality of types of media devices, and wherein the initiator is a personal computing device.

15. The method of claim 14, further comprising obtaining an object information data set describing characteristics of a selected object.

16. The method of claim 14, wherein the operations to obtain a device property description or an object property description yield one of the device property description data set and the object property description data set.

17. The method of claim 14, wherein obtaining a device information data set comprises determining a device category in a functional mode field of the device information data set.

18. The method of claim 14, wherein performing desired control operations comprises performing object capture using an object capture module.

19. The method of claim 14, wherein performing desired control operations comprises performing object revision using an object revision module.

20. The method of claim 14, wherein performing desired control operations comprises using an association mechanism to provide a reference from one object to at least one other object.

21. The method of claim 14, further comprising using a storage location module to locate each store associated with the media device.

22. The method of claim 14, further comprising opening a communication session with the media device using session control tools.

23. The method of claim 14, further comprising generating an event within the media device when a media device property changes.

24. A computer-readable medium having instructions embodied thereon that, when executed, performs the method recited in claim 14.

25. A system for facilitating control of multiple types of media devices utilizing an extensible protocol, the system comprising:
   device retrieval modules for retrieving information from a group of device data sets controlled by a media device of the multiple types of media devices, at least one of the group of device data sets includes a device information data set comprising that includes a set of properties specific to a type of a media device and a set of device properties comprising standard data codes that are common to all of a plurality of types of media devices using the extensible protocol and vendor-specific data codes that are specific to media devices of a vendor;
   object retrieval tools for retrieving object information from a group of object data sets stored on the media device;
   control command modules for controlling objects corresponding to still images, audio, or video on the media device by utilizing the retrieved information on the device information data sets and the extensible protocol; and
   computer storage media for storing information associated with facilitating control of the multiple types of media devices,
   wherein the object retrieval tools comprise an object information retrieval module for retrieving an object information data set, an object property retrieval module for retrieving an object property description data set, and an object handle retrieval module for retrieving a list of object handles,
   wherein the object property description data set includes meta-data associated with an object,
   wherein the meta-data includes descriptions, modifications, format information, associations, or combinations thereof,
   wherein the extensible protocol includes a set of extensions to support a plurality of different transport layers, the extensions comprising support for the standard data codes and the vendor-specific data codes, including a set of extensions to Picture Transfer Protocol,
   wherein the extensible protocol provides support for each of the plurality types of media devices, the plurality of types of media devices belonging to different categories,
   wherein the extensible protocol defines transport layer agnostic transfer of still images, audio and video, as well as meta-data associated with the still images, audio, and video, between a personal computing-device and the plurality of types of media devices.

26. The system of claim 25, further comprising session control tools for opening and closing a session with a media device.

27. The system of claim 25, wherein the device retrieval modules comprise a device information retrieval module for retrieving a device information data set and a device property retrieval module for retrieving a device property description data set.

28. The system of claim 25, wherein the control command modules include an object revision module for revising objects on the media device.

29. The system of claim 25, wherein the control command modules include an object capture module for initiating object capture.

30. The system of claim 25, wherein the control command modules further comprise an association mechanism for associating one object with at least one other object.

31. The system of claim 25, wherein the at least one of the group of device data sets include a device information data set including a list of supported properties and a device category.

32. The system of claim 31, wherein the group of device data sets comprise a device property description data set for describing device properties.

33. The system of claim 25, wherein at least one of the group of object data sets comprise an object information data set and an object property description data set.

34. A system for facilitating communication between an initiator and a responder utilizing an extensible protocol, the system comprising:
   device data sets stored with a responder, the device data sets including a set of device property comprising standard data codes that are common to all of a plurality of types of media devices using the extensible protocol, and vendor-specific data codes that are specific to media devices of a vendor, and an least one device category and a set of properties specific to the category;
   object data sets stored with the responder, the object data sets including information specific to each object stored on the responder, each object corresponding to still images, audio, or video;
   retrieval modules accessible to the initiator for gathering information from the device data sets to determine capabilities of the responder and gathering information from the object data sets; and
   control command modules accessible to the initiator for controlling the each object stored on the responder by utilizing the information and the extensible protocol,
   wherein the object data sets comprise an object information data set and an object property description data set,
   wherein the object property description includes meta-data associated with an object,
   wherein the meta-data includes descriptions, modifications, format information, associations, or combinations thereof,
   wherein the extensible protocol includes a set of extensions to support a plurality of different transport layers, the extensions comprising a support for the standard data codes and the vendor-specific data codes, including a set of extensions to Picture Transfer Protocol,
   wherein the extensible protocol provides support for each of the plurality of types of media devices, the plurality of types of media devices belonging to different categories and
   wherein the extensible protocol defines transport layer agnostic transfer of still images, audio, and video, as well as meta-data associated with the still images, audio, and video, between the personal computing device and the plurality of types of media devices,
   wherein the initiator is a personal computing device and the responder is one of the plurality of types of media devices.

35. The system of claim 34, further comprising control modules accessible to the initiator for controlling objects stored with the responder.

36. The system of claim 35, wherein the control modules comprise an object capture module and an object revision module.

37. The system of claim 35, wherein the control modules include an association mechanism for associating one object with at least one other object.

38. The system of claim 34, wherein the object data sets are configured to store information for a plurality of types of media, including image objects, audio objects, and video objects.

39. The system of claim 34, wherein the device data sets comprise a device information data set and a device property description data set.

40. The system of claim 34, wherein the object data sets comprise an object property value data set.

41. The system of claim 34, wherein the retrieval modules comprise a device information retrieval module and an object information retrieval module.

42. The system of claim 34, wherein the retrieval modules comprise an object information retrieval module, an object property retrieval module, and an object property value retrieval module.

* * * * *